Aug. 22, 1967     W. H. TAYLOR     3,336,910

WATER HEATER AND HEAT EXCHANGER

Filed June 16, 1966     3 Sheets-Sheet 1

INVENTOR
WILLIAM H. TAYLOR

BY Wheeler, Wheeler & Wheeler
ATTORNEYS

INVENTOR
WILLIAM H. TAYLOR
BY Wheeler, Wheeler & Wheeler
ATTORNEYS

Aug. 22, 1967 W. H. TAYLOR 3,336,910
WATER HEATER AND HEAT EXCHANGER
Filed June 16, 1966 3 Sheets-Sheet 3
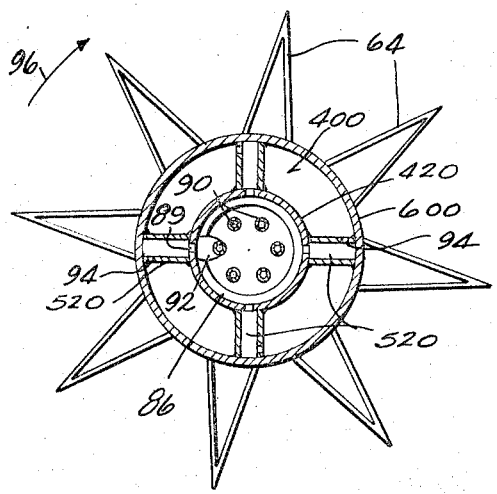
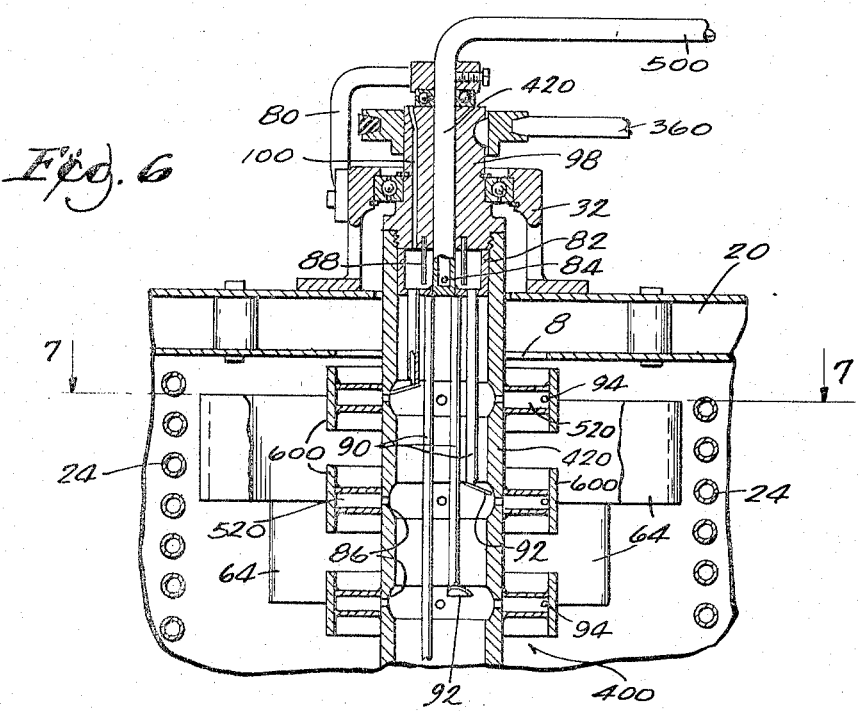
INVENTOR
WILLIAM H. TAYLOR
BY Wheeler, Wheeler & Wheeler
ATTORNEYS United States Patent Office 3,336,910
Patented Aug. 22, 1967

3,336,910
WATER HEATER AND HEAT EXCHANGER
William H. Taylor, 1710 Park Drive,
Raleigh, N.C. 27605
Filed June 16, 1966, Ser. No. 557,991
13 Claims. (Cl. 122—250)

This invention relates to a water heater and heat exchanger.

A major object of the invention is to provide high capacity and efficient operation in small spaces. By way of example and not by way of limitation, a successful embodiment of the invention using gas for fuel has a water coil 13 inches long with an internal diameter of 11½ inches and transfers heat to the water at a rate of 500,000 B.t.u. per hour with an efficiency of 80 percent. Another embodiment herein disclosed uses liquid fuel such as oil.

In both devices the fuel enters a tubular rotor which is operated by a motor which also drives the water pump. Supported from this pipe are axially spaced burners which receive fuel from the pipe. Supported directly or indirectly from the pipe are radial vanes which extend into immediate proximity to a heat exchanger to impel the products of combustion at high velocity across the exchanger with considerable turbulence, to which all surfaces are exposed. In practice, I have found it expedient to make the heat exchanger out of inner and outer helical coils which are somewhat spaced to provide maximum surface exposure to the turbulent gases.

The air and gas propelling vanes are hollow, V-shaped members open at their ends and having legs anchored to the rotor and apices in close proximity to the circular heat exchanger. These vanes operate in zones of very high temperature and are able to function only because air passes through them and escapes through the open ends of the vanes into the combustion chamber. The air required to support combustion is admitted through the rotor and escapes radially about the burners. The air which enters the interiors of the V-shaped vanes is not carbureted, the burners having no orifices directly beneath or within the respective vanes. The rest of the air passes burner orifices and is carbureted.

The combustion chamber in which the coils are located is surrounded by a jacket which preferably also encircles the lower part of the flue that opens from that chamber. All of the air required for combustion and for cooling the vanes preferably enters through openings provided in the jacket. It picks up heat from the external surfaces of the combustion chamber and returns it with the air to the interior of the chamber. The stack temperature in the exemplification above referred to is held to approximately 300° F.

There are specific differences between the gas-fired and oil-fired embodiments. In the former, the rotor is driven from the top and the gas enters from the bottom. The burners are rings supported from the rotor by radial gas pipes and perforated for gas escape only at points between vanes. In the oil-fired device, both the drive and the fuel inlet are at the top. Means is provided for apportioning the downwardly flowing oil between radial arms at different levels and for spraying it outwardly across the air stream and between the vanes.

In the drawings:

FIG. 6 is a fragmentary detail view in axial section similar to FIG. 4 of a modified embodiment of the invention using liquid fuel, portions being broken away.

FIG. 7 is a fragmentary view in cross section on the line 7—7 of FIG. 6.

Figure 1:
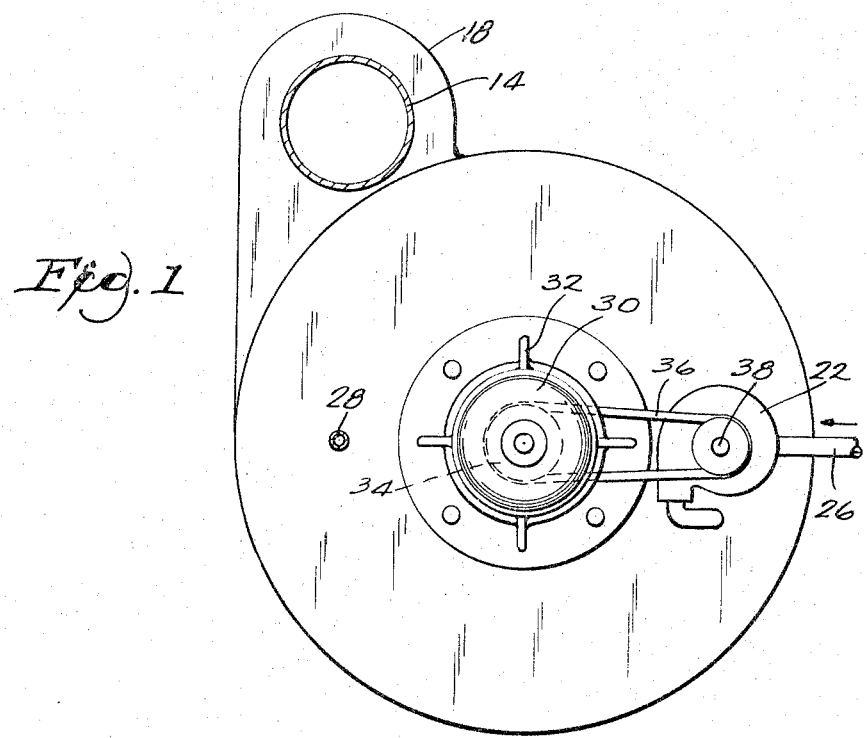
FIG. 1 is a plan view of a preferred embodiment of the invention, the stack being shown in section.
Figure 2:
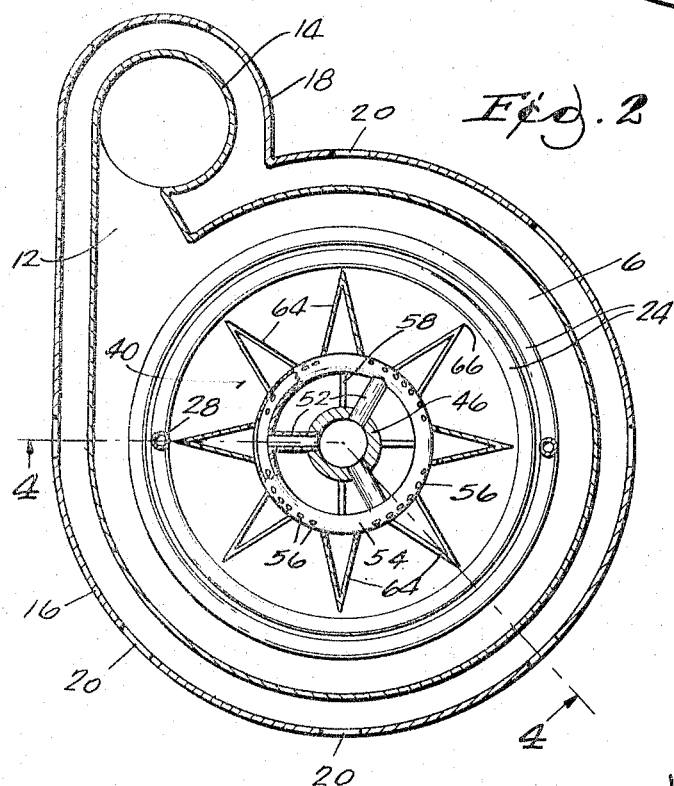
FIG. 2 is a view taken in horizontal section on the line 2—2 of FIG. 4.

The combustion chamber 6 has top and bottom central air inlets at 8 and 10. A tangential outlet at 12 communicates with the flue or stack 14. Chamber 6 is supported within a jacket 16, which preferably has an extension 18 enclosing the lower portion of stack 14. The jacket is provided with inlet ports 20 through which enters air then admitted to the combustion chamber through the upper and lower ports 8 and 10.

The water to be heated is forced by pump 22 through a heat exchanger 24 which is preferably a double helical coil as shown. The heat exchanger is not necessarily a helical coil but it should include convolutions with maximum surface area for heat transfer. Thus the coil is a desirable arrangement. Water enters the pump through the inlet pipe 26 and is discharged from the coil through a delivery pipe 28.

A motor 30 is mounted on bracket 32 on the top of the device. By means of pulley 34 and belt 36, it drives the pump shaft 38. Axially aligned with the motor and driven thereby is a rotor generally designated by reference character 40. A shaft 42 is connected through coupling 44 with the shaft of motor 30. Immediately within the combustion chamber 6, shaft 42 is attached to a tubular shaft 46 positioned at its lower end by a bearing member 48 which can conveniently be made of graphite. The member 48 has the form of a collar mounted upon the delivery end of the gas supply pipe 50, the latter being positioned on the base 49 which supports the jacket and combustion chamber.

Radial pipes 52 opening from the central tubular shaft 46 of rotor 40 communicate with the interior of the tubular shaft 46 and support (and communicate with) annular burners 54 which have gas escape apertures 56 in arcuately spaced series, the spacing being such that the gas is not delivered into the interior of the hollow vanes hereinafter described.

Figure 3:
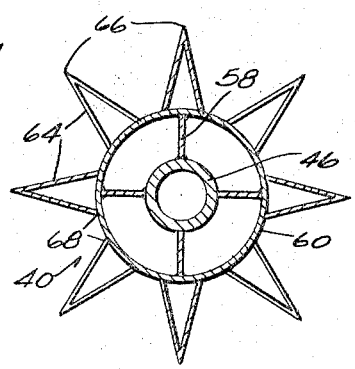
FIG. 3 is a cross section through the rotor on the line 3—3 of FIG. 5.

As shown in FIG. 3, the rotor 40 includes radial arms 58 carried by the tubular shaft 46 and supporting for rotation with the shaft a series of collars 60. These collars alternate with the annular burners 54 and are desirably of comparable radius, being spaced from each other and from the burners to proved annular slots 62 both above and below each burner and to which air is supplied for combustion of the gas. The aligned collars 60 and burner rings 54 provide an annular air passage about the tubular shaft 46. This passage is continuous except for the slots 62 through which the air is delivered to the combustion chamber. This annular passage communicates at the top with the air inlet port 8 of the combustion chamber and at the bottom with the air inlet port 10.

Vanes 64 which are hollow and V-shaped in plan are mounted on the collars 60 to be supported thereby and driven as a part of rotor 40. The action of the vanes produces rapid air movement through the passage and outwardly across the burners and into the vanes to impel the products of combustion at high velocity and with considerable turbulence across all surfaces of the coil 24. The vanes are preferably arranged in annular series with their apices 66 directed outwardly and their base margins or legs 68 anchored to the collars 60. The angularly spaced vanes 64 at one level are desirably staggered with respect to the angularly spaced vanes 64 at a different level. In the exemplification above described and herein illustrated, I have used four vanes at each level with the apices of vanes at any given level being offset 90 degrees from each other and offset 45 degrees from vanes at adjacent levels. As elsewhere in this description, the particulars given are by ways of exemplification and not by way of limitation.

It will be observed that the gas outlet ports 56 of the annular burners 54 are so located that they do not open to the interiors of the vanes 64. This is very important because the flame temperatures of the burning gases in the combustion chamber are above 3000° F. in this exemplification. By excluding these burning gases from the interiors of the vanes and by passing relatively cold air into the vanes, to escape therefrom through their open ends, the vanes are kept sufficiently cool to function properly. They are made of an alloy which is highly heat resistant, but even the use of such an alloy would not protect the vanes except for the cooling means described. Upon comparison of FIGS. 4 and 5, it will be noted that most of the vanes 64 are carried in part by each of two of the collars 60 so that they span not only one of the burner rings 54 but two of the annular slots 62 through which air is escaping at considerable velocity, being impelled centrifugally by the blower action of the vanes.

Figure 4:
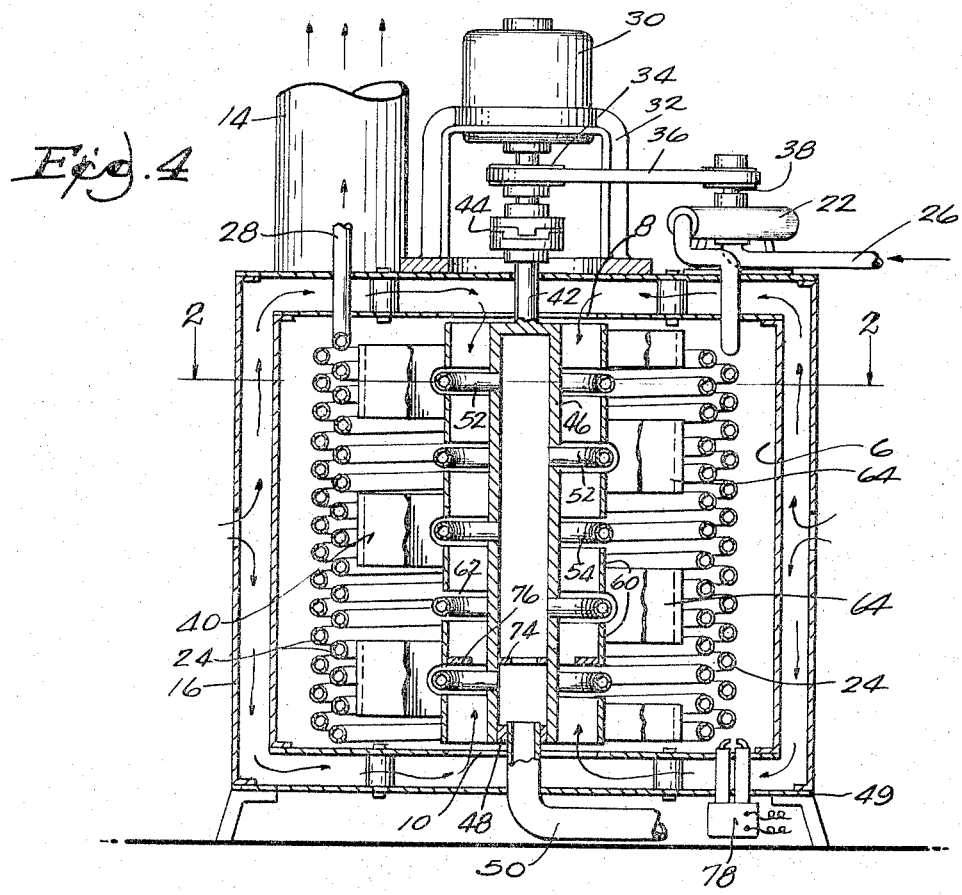
FIG. 4 is a view in axial section taken on the line 4—4 of FIG. 2.
Figure 5:
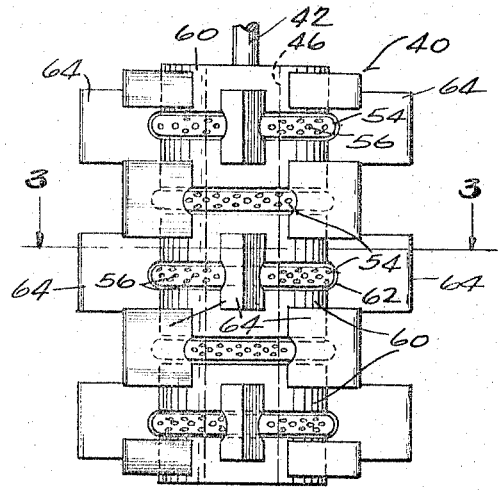
FIG. 5 is a detail view of the rotor in elevation.

To assure proper distribution of the gas and the air notwithstanding convection currents within the apparatus, it has been found expedient to use annular baffles for gas and air as shown respectively at 74 and 76 in FIG. 4. The baffles shown in FIG. 4 have been found satisfactory in the instant embodiment but it will be understood that the exact locations of the baffles is a matter of design and will vary according to the requirements of the particular heater embodying the invention.

To start the device, the motor 30 is set into operation and gas is admitted through the supply pipe 50 and is ignited by the ignition coil 78 and oxidized by air pulled through the device by the centrifugal action of the vanes. Intense heat is immediately developed within the combustion chamber 6. Almost all of such heat is picked up by the water in the coils 24. A large part of the remainder is picked up and returned into the combustion chamber by the air traversing the jacket 16. Therefore, the flue gases discharged through the tangential outlet 12 to the stack 14 are at relatively low temperatures.

The embodiment fired with liquid fuel (such as oil) is shown in FIGS. 6 and 7 and is essentially similar to that above disclosed. Preferably it is upright and the fuel is fed from the top through a stationary hollow pipe 420 supplied with fuel by tube 500. An arm 80 on the bracket 32 supports the pipe 420. The pipe carries a relatively stationary cup 82 into which the fuel is discharged from such pipe through one or more lateral openings 84 (FIG. 6).

The rotor 400 comprises a pipe having an axis of rotation concentric with the cup 82. This pipe is provided in its inner surface with annular channels 86 respectively disposed at the level of the radial pipes 520 which support the rings 600.

To assure equal allocation of fuel to the several burners, the rotor has fingers 88 which rotate within the cup 82 and equalize fuel delivery through the bottom of the cup to a series of depending tubes 90, which are of different length. Each tube is provided at its end with a deflector 92 extending into one of the channels 86 for assuring that the fuel passing downwardly through the tube will enter the respective channel where it will be centrifugally ejected through one of the ports 88 into one of the radial pipes 520. These pipes and the rings 600 actually constitute the burners in this embodiment.

At the end of each pipe 520 and immediately adjacent the ring 600 welded to the end of such pipe is a port 94 directed rearwardly with respect to the direction of rotation of the rotor 400. See the arrow 96 in FIG. 7. The fuel issuing from the respective ports 94 is atomized by being projected centrifugally over the margins of the supporting ring 600 immediately behind the vanes 64 which are supported on such rings. Thus the fuel is discharged in a spray of fine droplets directly in the path of the air issuing from passages between the rings as already described in connection with the discussion of FIGS. 1 to 5.

An appropriate ignition device fires the fuel and the vanes are cooled by a part of such air as they impel the products of combustion across the encircling heat exchanger with great turbulence as already described.

To the extent that vapor accumulates in the cup 82, it is desirable to eject it. Accordingly, I may provide the cap member 98 at the top of the rotor shaft 420 with an air admission port 100 for the admission of air. This air will be drawn through the several tubes 90 with the fuel as the result of suction produced by the centrifugal action of the blower vanes. The air will carry with it any fuel vapor, dividing it equally between the several pipes 520 which convey the oil to the atomizing ring 600.

The rotor 400, instead of being directly connected with the armature shaft of the driving motor, as in FIG. 4, is driven by belt 360 from a similar motor which is offset (not shown).

In all other respects the operation of the liquid fuel device is like the operation of the gas-fired device and therefore needs no further description.

I claim:

1. A heater comprising the combination with a combustion chamber having a flue port, of a circular heat exchanger in the combustion chamber, means for passing through said exchanger a fluid to be heated, burner means adjacent the center of the exchanger, means for supplying fuel to the burner means, means for admitting air into proximity to said burner means to be carbureted by said fuel, and a set of vanes having means for rotating them substantially coaxially with said exchanger and externally of said burner means, the tips of said vanes being in close proximity to the exchanger and the vanes being hollow and having openings exposed to receive interiorly some of said air for the cooling of the vanes, said vanes having escape openings through which such air is released into the chamber after cooling the vanes.

2. A heater according to claim 1 in which the means for supplying fuel is a gas fuel connection and the burner means is a gas burner.

3. A heater according to claim 1 in which the means for supplying fuel comprises a liquid fuel connection and the burner means comprises fuel delivering pipes and fuel atomizing means to which said pipes have discharge connections for the delivery of fuel for atomization between vanes.

4. A water heater comprising the combination with a combustion chamber having a flue gas outlet, of a coil extending circuitously of said chamber and including successive turns in close proximity to each other and disposed between the ends of the chamber, means for propelling through the coil a fluid to be heated, a rotor including a pipe within the coil and having means mounting it for rotation, means providing a fuel connection to said pipe, means for actuating the rotor, burner means mounted on the pipe to partake of the rotation thereof and having communication with the interior of the pipe to receive fuel therefrom, an air passage comprising mutually spaced baffle means arranged encircling the pipe, means for introducing air into the passage to support the combustion of fuel at the burner means, the spacing between said spaced means providing a delivery port for the centrifugal discharge of said air past said burner means, and at least one hollow vane having means supporting it from the pipe and adapted to receive from said port a part of such air for the cooling of the vane, the vane having outlet means for the discharge of air by which it has been cooled, said vane having a portion remote from said pipe which rotates in close proximity to a part of said coil to create turbulent flow of products of combustion over said coil.

5. A heater according to claim 4 in which the coil is generally cylindrical and a plurality of vanes are mounted from said pipe to project in various radial directions from the pipe, all of said vanes being hollow and adapted to receive air from said annular baffle means.

6. A heater according to claim 5 in which the respective vanes are V-shaped in a plane transverse to the axis of rotation of the pipe and have apices which are in close proximity to the coils in the course of pipe rotation.

7. A heater according to claim 6 in which the respective vanes are mounted on the baffle means, said baffle means spanning said burner means, the burner means having fuel emitting orifices which are disposed between vanes and being substantially imperforate in the areas spanned by the vanes.

8. A heater according to claim 6 in which the respective vanes are mounted on the baffle means, burner means comprising fuel emitting orifices arranged to deliver fuel onto the interior surfaces of the baffle means to be atomized by projection over the margins thereof.

9. A heater according to claim 6 in which the combustion chamber is provided with a jacket having air admission ports, the combustion chamber having port means opening from the jacket into said passage, air being drawn by said vanes from the jacket through said passage, whereby the air used for combustion passes through the jacket to pick up heat from said combustion chamber and to return such heat to the interior of the chamber.

10. A gas-fired water heater comprising a central rotor, a heat exchanger encircling the rotor and comprising tube means and a water pump connected therewith for passing water through the heat exchanger, a combustion chamber enclosing the heat exchanger and having air inlet port means, the rotor comprising within the heat exchanger a rotatable pipe for fuel, means for supplying fuel to said pipe, annular burner means mounted in mutually axially spaced relation upon the pipe and communicating with the interior thereof and comprising duct means supported from the pipe and baffles spaced from each other to provide an air passage communicating with said air inlet port means, and sets of vanes mounted on the spaced baffles and supported thereby from the pipe to partake of the rotation thereof, said vanes being V-shaped with leg portions connected with the baffles and apices remote therefrom and proximate said heat exchanger, certain of said vanes being adapted to receive from said passages a portion of the air admitted through said port for cooling the vanes, other portions of the air providing oxidation for the fuel issuing from said burner means, the burner means comprising means for delivering fuel between vanes.

11. A heater according to claim 10 in which the combustion chamber has a jacket spaced therefrom and provided with multiple air inlets, said jacket having communication through the air inlet port with the said passages.

12. A heater according to claim 10 in which the means for supplying fuel comprises an inlet tube having a terminal cup within the pipe and about which the pipe rotates, the pipe having interior annular channels at the level of the several burner means and from which said duct means open, said cup having a tube leading to the level of each said channel and provided at its end with means for directing fuel into said channel.

13. A heater according to claim 12 in which the duct means supported from the pipe and receiving fuel from the respective channels have ports which are located adjacent respective baffles and are directed rearwardly with respect to the movement of said rotor, the ports delivering the fuel onto the interior surfaces of the respective baffles for atomization in the discharge of such fuel across the margins of said baffles during rotation of said rotor.

References Cited
UNITED STATES PATENTS

| | | | |
|---|---|---|---|
| 1,623,746 | 4/1927 | Murray | 122—235 |
| 2,223,856 | 12/1940 | Price | 122—250 |

KENNETH W. SPRAGUE, *Primary Examiner.*